Figure 1:
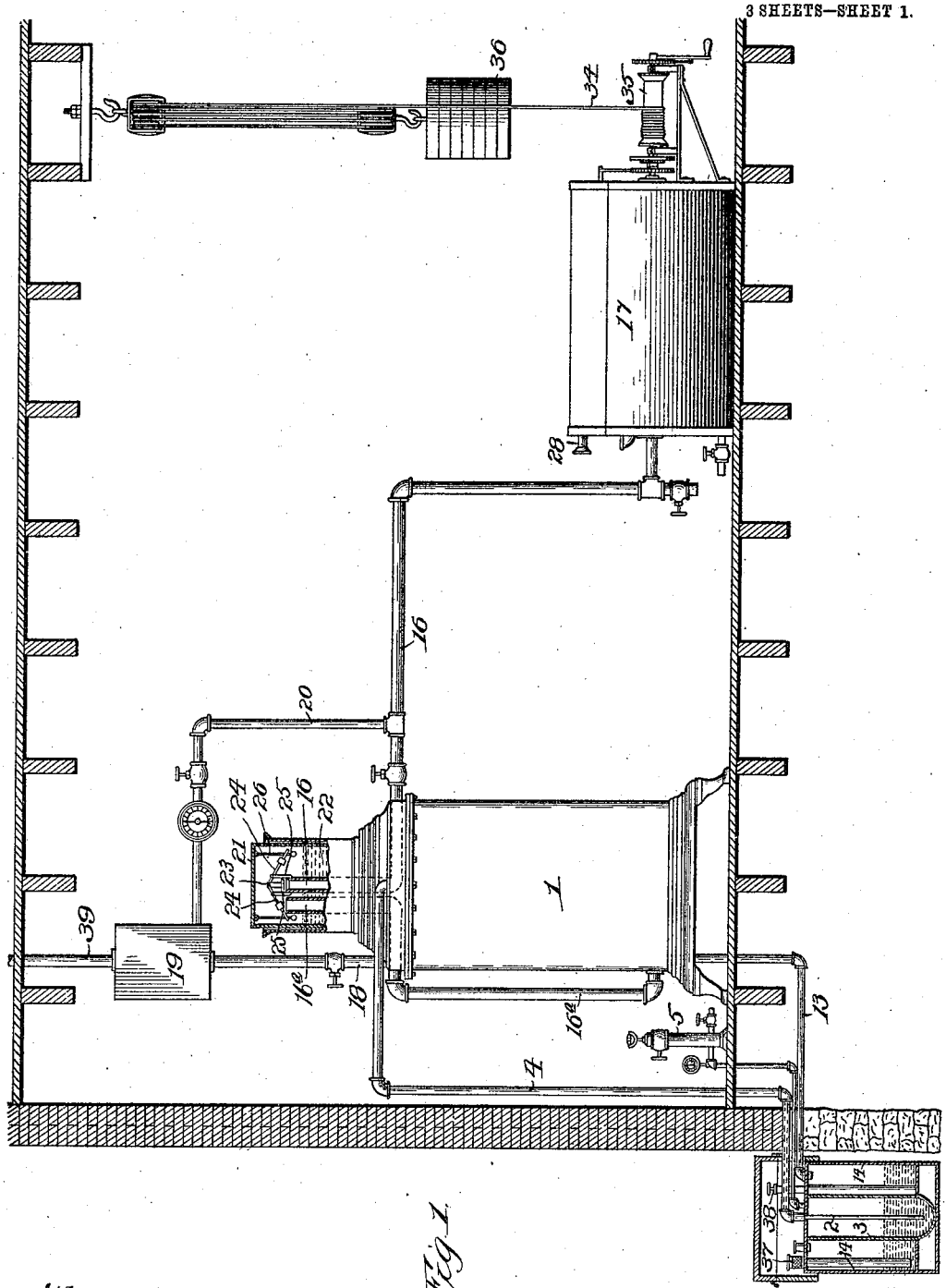

No. 847,362. PATENTED MAR. 19, 1907.
J. T. PARIS.
APPARATUS FOR MANUFACTURE OF GAS.
APPLICATION FILED APR. 9, 1906.

3 SHEETS—SHEET 1.

Witnesses:
Irving MacDonald
J. E. Falk

Inventor:
James T. Paris,
By Barton Tanner
Attys.

No. 847,362. PATENTED MAR. 19, 1907.
J. T. PARIS.
APPARATUS FOR MANUFACTURE OF GAS.
APPLICATION FILED APR. 9, 1906.
3 SHEETS—SHEET 2.
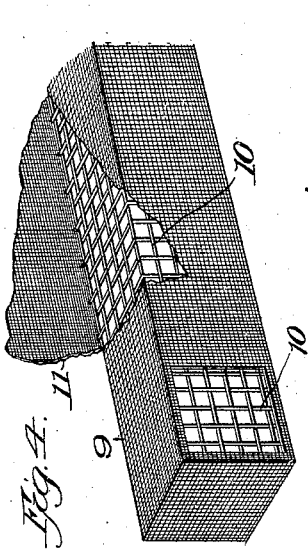
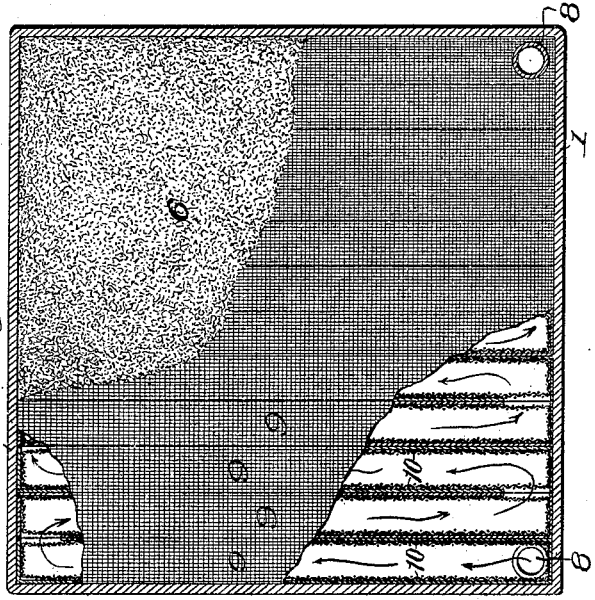
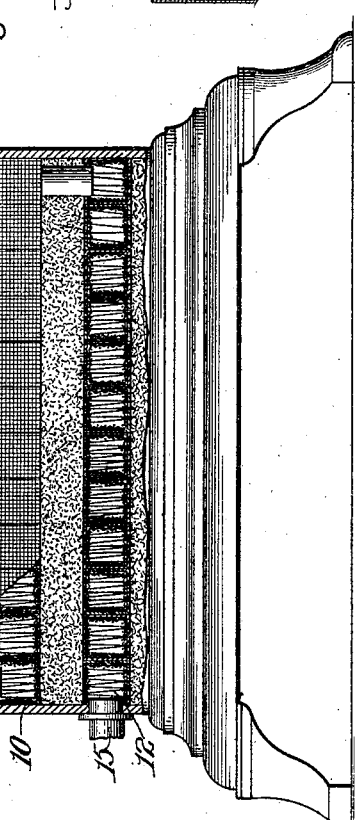
Witnesses:
Irving MacDonald
G. L. Falk
Inventor:
James T. Paris,
By Borton Tanner
Attys.

No. 847,362. PATENTED MAR. 19, 1907.
J. T. PARIS.
APPARATUS FOR MANUFACTURE OF GAS.
APPLICATION FILED APR. 9, 1906.
3 SHEETS—SHEET 3.
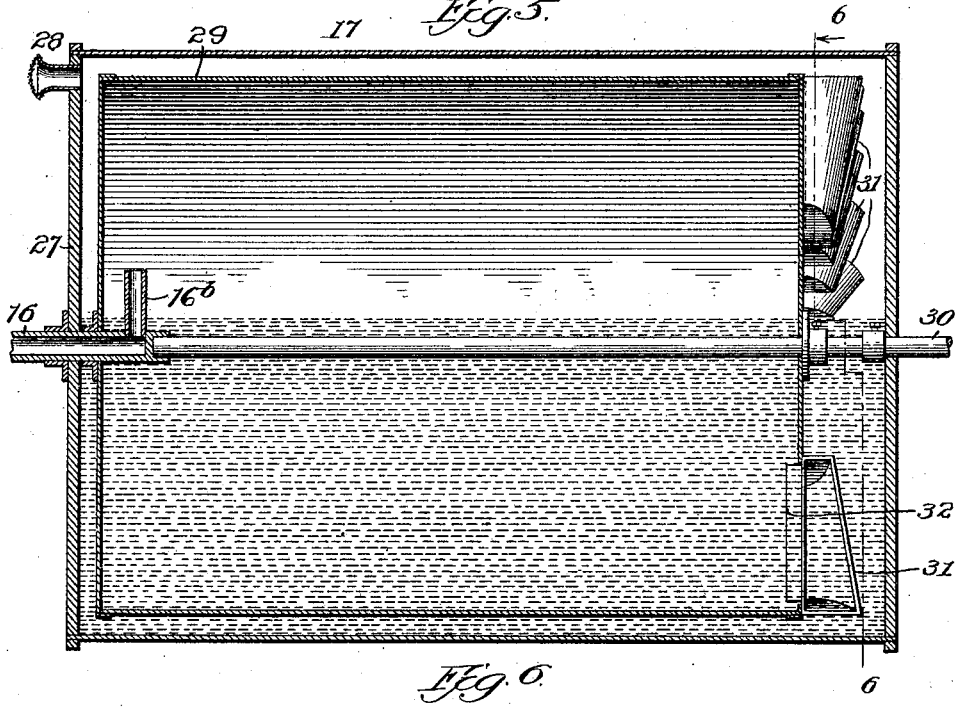
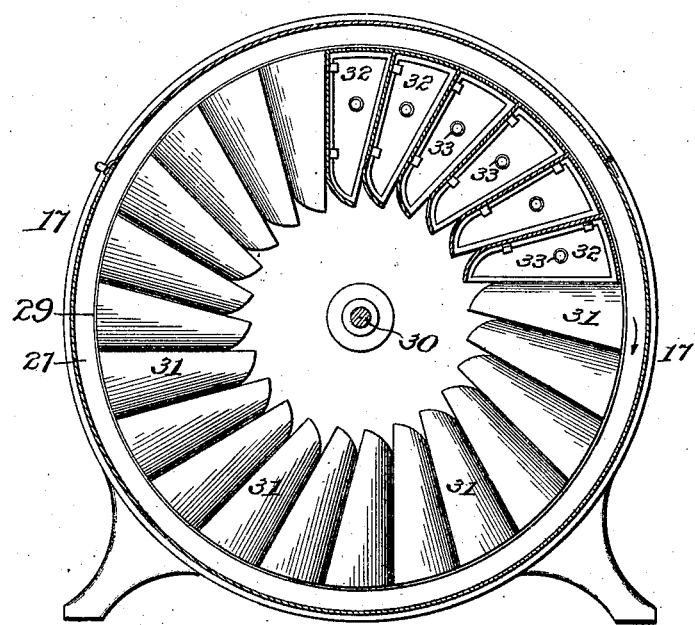
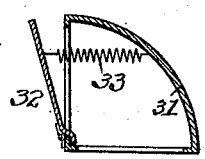
Witnesses:
Irving MacDonald
G. E. Falk
Inventor
James T. Paris,
By Barton Tanner
Attys.

UNITED STATES PATENT OFFICE.

JAMES T. PARIS, OF CHICAGO, ILLINOIS.

APPARATUS FOR MANUFACTURE OF GAS.

No. 847,362.     Specification of Letters Patent.     Patented March 19, 1907.

Application filed April 9, 1906. Serial No. 310,591.

*To all whom it may concern:*

Be it known that I, JAMES T. PARIS, a citizen of the United States, residing at Chicago, in the county of Cook and State of Illinois, have invented a certain new and useful Improvement in Apparatus for the Manufacture of Gas, of which the following is a full, clear, concise, and exact description.

My invention relates to apparatus for the manufacture of gas from gasolene or other hydrocarbon; and its object is to provide simple and efficient apparatus automatic in operation and capable of producing a gas which as it escapes from the carbureting-chamber is of extreme richness and of uniform quality.

One feature of my invention consists in an improved carbureter in which, within a compact structure, a very large evaporating-surface is provided. The interior of the carbureter consists of alternate layers of multicellular chambers and absorbent material. The cells of each chamber are arranged side by side and are connected in series to form a tortuous path. The several chambers are themselves connected in series through openings in the layers of felt connecting the last cell of one chamber to the first cell of the next, thereby forming a continuous path for the air from bottom to top of the carbureter. The walls of these cells are formed of material that will readily absorb the hydrocarbon, thus providing a large evaporating-surface from the sides of the air-passage itself.

A further feature of my invention consists in the means for controlling the flow of air into and through the carbureter, said means being automatic and dependent upon the consumption of gas generated in the carbureter and the consequent demand for a fresh supply of air to be treated in the same.

These and other features of my invention may be readily understood by reference to the accompanying drawings, in which—

Figure 1 is a side elevation, with parts in section, of apparatus embodying my invention. Fig. 2 is a vertical section of the carbureter, the top portion of the carbureter being broken away. Fig. 3 is a section approximately on the line 3 3 of Fig. 2, showing the internal construction of the carbureter. Fig. 4 is a fragmentary detail perspective of one of the cells forming the air-passage. Fig. 5 is a central vertical longitudinal section of the pump for supplying air to the carbureter. Fig. 6 is a sectional view on the line 6 6 of Fig. 5. Fig. 7 is a detail view, in cross-section, of one of the cups of the pump.

Similar letters of reference designate like parts throughout the several figures.

The carbureter 1, through which the air to be carbureted is passed, is supplied with gasolene or other hydrocarbon in any suitable manner. As shown in Fig. 1, a pipe 2 leads from a tank 3, containing gasolene, to the top of the carbureting-chamber, said pipe 2 being surrounded by a guard-pipe 4. The pressure necessary to force the gasolene through the pipe 2 is supplied in the usual manner by an air-pump 5.

The interior structure of the carbureting-chamber is shown in Fig. 3 and consists of alternate layers of fibrous material 6 and multicellular chambers 7. The chambers 7 are connected in series by pipes or openings 8. Each chamber 7 has arranged therein in parallel relation a series of cells or units 9, having an opening at or near each end, preferably on opposite sides, communicating with an opening in the adjacent cell, thus connecting all the cells of a chamber in series, as clearly shown in Fig. 3. The last cell of one chamber communicates, through the pipe 8, with the first cell of the next chamber, all the cells being thus connected in series to form a tortuous path from the bottom to the top of the carbureting-chamber. Each cell 9 is preferably of rectangular cross-section and has its sides formed of reticulated wire 10, covered with cloth 11, that will soak up the liquid hydrocarbon, thus providing all four sides of the passage through the cell with evaporating-surfaces. To provide still further evaporating-surface, threads 12, of cotton-wicking or similar material, may be run across the interior of each cell from top to bottom, said threads preferably extending through the walls to contact with the absorbent layer 6, thus being directly supplied therefrom with gasolene by capillary attraction. The layers 6 are made of some fibrous material, such as cotton, that will readily absorb the gasolene. The gasolene is delivered through the pipe 2 to the upper layer of absorbent material and trickling down through the carbureter maintains all of said layers, as well as the walls 11 and threads 12, thoroughly saturated. Any surplus of gasolene accumulating at the bottom of the carbureter is returned by an escape-pipe 13 to the feed-tank 14 surrounding the tank 3.

At the bottom of the carbureter is an inlet 15, communicating with the first cell 9 of the lowermost multicellular chamber 7. Air is delivered through this inlet by a pipe $16^a$, leading from a chamber, which in turn is furnished by the pipe 16 with air delivered under pressure from the pump 17. By the peculiar construction of the apparatus of my invention the air entering at the bottom of the carbureter passes through a long and tortuous passage before emerging at the top through the outlet-pipe 18. Not only is this air-passage of great length compared to the size of the carbureter, but in addition the construction is such as to provide a carbureting-chamber which is extremely efficient in its capacity for furnishing hydrocarbon vapors to the air passing therethrough. As a result the carbureted air or gas emerging from the pipe 18 is of extreme richness. In case the gas is to be used for heating or illuminating purposes it is first passed through a mixer or filter 19, where it is intermingled with air furnished by the pipe 20, branching off from pipe 16. This mixer may be of the usual well-known construction and forms no part of my present invention.

The pipe 16 leads from the pump 17 to the bell 21, which is inverted in the tank 22 of water and acts as an aerometer. The opening at the end of the pipe 16 is controlled by a valve 23, carried by the levers 24 24, pivoted upon standards 25 25. One end of each lever is connected to the bell 21 by a rod 26, so that when the bell is lifted a certain amount by the pressure of the air the levers 24 24 are raised and the valve 23 closed. When the pressure decreases and the bell descends, the levers are operated by gravity or otherwise to open the valve. The pipe $16^a$ leads from the bell 21 to the inlet 15 of the carbureter. It is apparent, therefore, that the flow of gas through the pipe 18 regulates the pressure of air beneath the bell 21, and hence the admission of air to the carbureting-chamber. In case, for example, the consumption of gas entirely ceases the valve 23 is closed and the supply of air through pipe 16 cut off. The pump 17 comprises a hollow drum 27, partially filled with water or other liquid. Said drum is provided with an air-inlet 28. Within the drum 27 is a revoluble drum 29. A revoluble shaft 30 has bearings in one end of the drum 27, the inner end of said shaft having also a bearing in the end of the pipe 16. The drum 29 is mounted so as to revolve with the shaft 30, one end of said drum being fastened upon said shaft, the other end revolving about the pipe 16 as an axis. The pipe 16 has an extension $16^b$ communicating with the interior of the drum 29. One end of the drum 29 is provided on its outside with a series of cups 31, having a pivoted valve or door 32 opening into the interior of the drum 29, said valve being normally held closed by a spring 33. However, when the drum is revolved in the direction indicated in Fig. 6 the air within the cup is compressed by the water and opens the valve 32, thus pumping air from the drum 27 into the drum 29 and from thence through pipe 16 to the carbureter.

In Fig. 1 I have shown a well-known means for operating the shaft 30. When the rope 34 is wound on the drum 35, the weights 36 tend to rotate the drum 35 in a direction to unwind the rope, and by suitable gearing this rotation is transmitted to the shaft 30, thus operating the pump 17 to furnish air to the carbureter. As hereinbefore described, when the consumption of gas ceases the valve 23 is automatically closed. It is one of the features of my invention that the closing of the valve 23 results in the cessation of the operation of the pump 17. This is due to the fact that the doors 32, being held closed except when the cups 31 are beneath the water, the air is unable, however much compressed, to escape from the drum 29 back into the drum 27. The pressure of the air in the drum 29 when the flow of air through the pipe 16 ceases is such that the door 32 is held closed. By proper adjustment of the weight 36 the failure of the valve 32 to open prevents the rotation of the drum 29, and hence prevents the unwinding of the rope 34 from the drum 35. It is apparent, therefore, that by the particular structure of the apparatus of my invention the air can escape from the drum 29 only through the pipe 16, and when this outlet is closed the weight 36 remains in its suspended position. There is no running down of the weight 36 except in doing useful work. For this reason it is necessary to wind up the rope 34 on the drum 35 only at long intervals instead of at frequent intervals, as is the case in other well-known types of pumps for supplying air to carbureters.

The operation of my improved apparatus is as follows: Gasolene or other hydrocarbon is supplied to a tank 14, located at any convenient position, through a pipe 37, and from thence is admitted as may be needed into the tank 3, the communication between said tanks being controlled by a valve or other similar device operated by the handle 38. By operating the air-pump 5 the liquid hydrocarbon is forced through the pipe 2 into the upper part of the carbureter 1, thoroughly saturating the absorbent layers 6, the cloth covering of the cells 9, and the threads 12. Any surplus escapes from the bottom of the carbureter-chamber through a pipe 13 into the tank 14. Under normal conditions the valve 23, controlling the admission of air through the pipe 16, is open, and air is forced by the pump 17 into the chamber between the inverted bell 21 and the water in the tank 16, from whence it escapes through pipe $16^a$ into the lower part of the carbureting-chamber. The air in passing through the tortuous passage formed by the cells 9, connected in series, becomes thoroughly saturated with hydrocarbon vapor and is led out through the gas-discharge pipe 18, from whence it is ordinarily passed through a mixer or purifier 19. The gas passing through the pipe 39 can be made by the proper adjustment of the amount of air supplied thereto by the pipe 20 of any desired richness, dependent upon the purposes for which it is to be used. By my improved apparatus gas can be readily produced of the extreme richness required for use in the ordinary gas-engine.

The air-pump and the aerometer comprising the means for controlling the flow of air into and through the carbureter are not claimed herein, but are expressly reserved to form the subject-matter of a future application or applications.

I claim—

1. In apparatus for the manufacture of gas, a carbureter having an interior space divided into alternate layers of multicellular chambers and absorbent material, the cells of each chamber being connected in series with each other and with the cells of the other chambers to form a continuous passage for air through the carbureter.

2. In apparatus for the manufacture of gas, a carbureter having an interior space divided into alternate superposed layers of multicellular chambers and absorbent material, the cells of each chamber being connected in series with each other and with the cells of the other chambers to form a continuous passage for air through the carbureter, the walls of said cells comprising absorbent material entirely surrounding the air-passage.

3. In apparatus for the manufacture of gas, a carbureter having an interior space divided into alternate layers of multicellular chambers and absorbent material, each of said cells having a covering of absorbent material adapted to be saturated with hydrocarbon held by said absorbent layers, the cells of each chamber being connected in series with each other and with the cells of the other chambers to form a continuous passage for air.

4. In apparatus for the manufacture of gas, a carbureter having an interior space divided into alternate superposed layers of multicellular chambers and absorbent material, each of the cells being composed of a reticulated wire body covered with cloth adapted to be saturated with hydrocarbon held by said absorbent layers, the cells of each chamber being connected in series with each other and with the cells of the other chambers to form a continuous passage for air from the bottom to the top of the carbureter.

In witness whereof I hereunto subscribe my name this 7th day of April, A. D. 1906.

JAMES T. PARIS.

Witnesses:
HENRY FENTON,
GEORGE E. FOLK.